Inventors
Theodore R. Thoren
Paul P. Johnson.

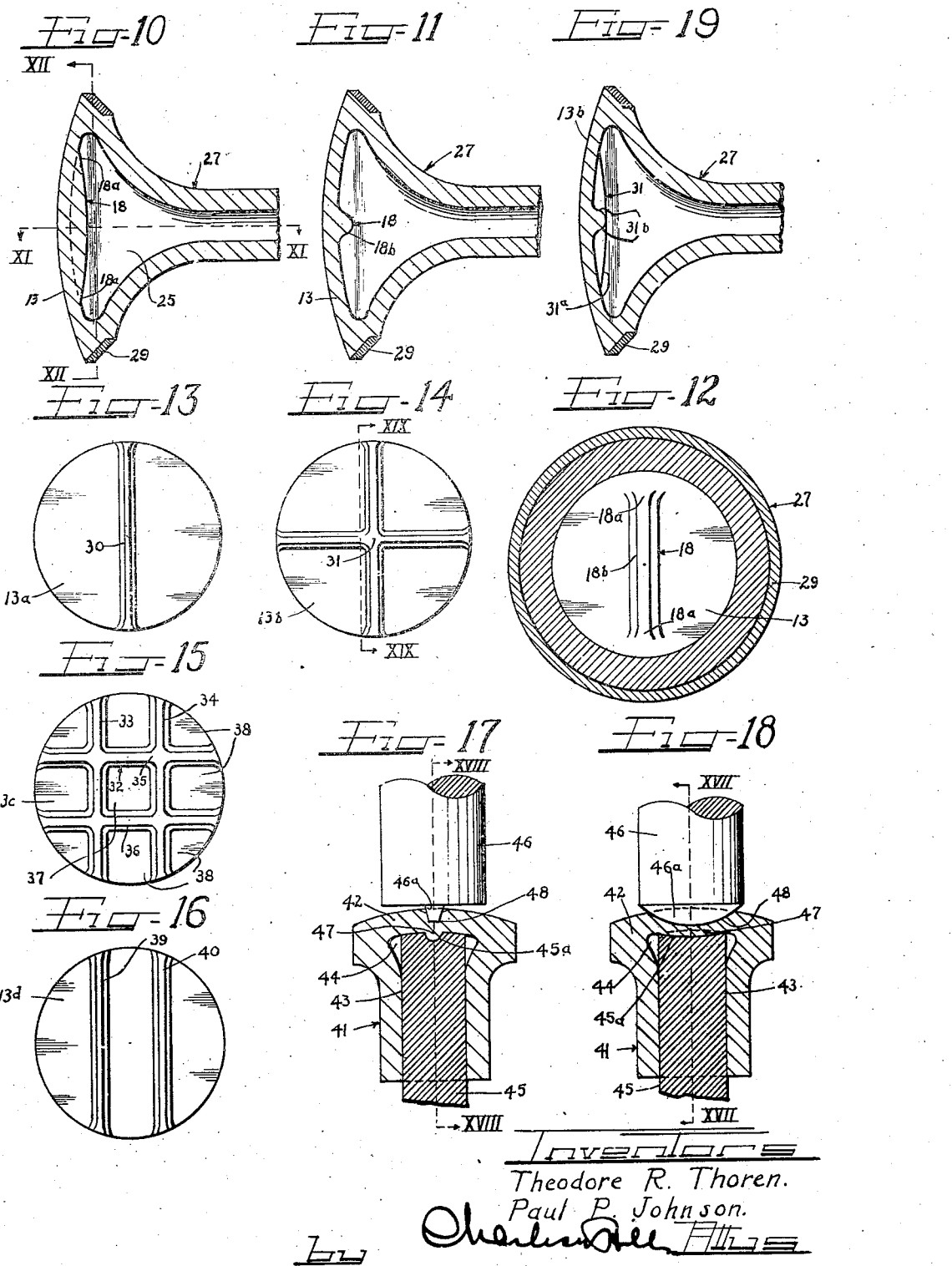

Patented Nov. 26, 1946

2,411,764

UNITED STATES PATENT OFFICE 2,411,764

METHOD OF MANUFACTURING RIBBED DOME HOLLOW HEAD VALVES

Theodore R. Thoren and Paul P. Johnson, Cleveland, Ohio, assignors to Thompson Products, Inc., a corporation of Ohio Original application August 30, 1940, Serial No. 354,778. Divided and this application January 30, 1943, Serial No. 474,112

3 Claims. (Cl. 29—156.7)

This invention relates to the reinforcing of hollow head valves.

More specifically the invention relates to the production of hollow poppet valves with one or more internal ribs formed on the dome of the valve head to better resist higher external pressures acting on the valve head.

This application is a division of our copending application Serial No. 354,778, filed August 30, 1940, now Patent No. 2,328,512, granted August 31, 1943.

Increasingly higher compression ratios, explosion pressures and motor temperatures in internal combustion engines are causing collapse of hollow head valves. This collapse usually occurs in the top wall or dome of the valve directly above the head cavity. While the domes of the valves could be made thicker to better resist the tremendous pressures to which they are subjected, the use of more metal in the valve head is undesirable for a number of reasons. For example, the resulting valves will be heavier, the heat retention in a thick, solid metal wall is greater than in a thin, solid metal wall, and the head cavity would have to be made smaller, thereby reducing the amount of coolant such as metallic sodium that could operate in the cavity for dispersing the heat away from the head of the valve.

According to the present invention, the heads of hollow poppet valves are stiffened by means of one or more internal ribs. These internal ribs are formed integrally on the inner wall of the valve head and act as a reinforcing strut for the dome of the valve to reinforce the same against collapse without, however, resulting in the disadvantages of a thick-walled dome. The ribs, according to this invention, are preferably formed by die pressure during the course of manufacturing the hollow poppet valve.

It is, then, an object of the invention to make hollow head poppet valves with reinforcing ribs stiffening the valve heads.

Another object of the invention is to increase the resistance of hollow valve heads against collapsing under external pressures by forming therein localized reinforcing ribs depending from the inner wall of the dome of the valve.

Another object of the invention is to make hollow valves having increased resistance against collapsing by external pressures without increasing the thickness of the valve walls.

Another object of the invention is to form ribbed dome hollow head valves by die pressure operations.

A specific object of the invention is to provide a method for forming integral ribs in the domes of hollow head valves out of metal originally present in the wall of the dome.

Other and further objects of the invention will be apparent to those skilled in the art from the following detailed description of the annexed sheets of drawings which disclose preferred embodiments of the invention.

On the drawings:

Figure 10 is a fragmentary longitudinal cross-sectional view of a rib dome valve according to this invention.

Figure 11 is a cross-sectional view taken along the line XI—XI of Figure 10.

Figure 12 is a cross-sectional view taken along the line XII—XII of Figure 10.

Figures 13 to 16 inclusive are inside face views of various types of ribbed domes for valve heads obtainable according to this invention.

Figure 17 is a vertical cross-sectional view taken along the line XVII—XVII of Figure 18 illustrating another method of forming an internal rib in the dome of a hollow head valve body.

Figure 18 is a cross-sectional view, with parts in elevation, taken along the line XVIII—XVIII of Figure 17.

Figure 19 is a cross-sectional view taken along the line XIX—XIX of Figure 14.

Figure 1:
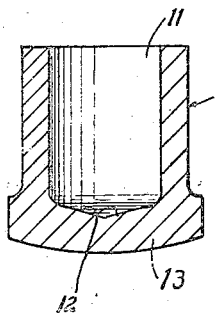
Figure 1 is a vertical cross-sectional view taken through a metal billet forming a blank.

As shown on the drawings:

In Figure 1 the reference numeral 10 designates generally a blank formed from a solid metal slug by piercing the same to form therein a blind bore 11 having an inclined blind end 12. A dome head 13 of increased diameter is also formed on the blank. While the blank 10 is preferably formed by piercing or forging operations, it should be understood that the same can be cast into the form shown in Figure 1.

Figure 2:
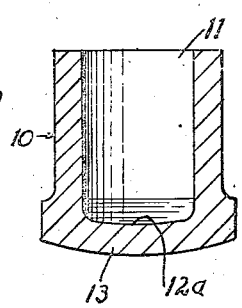
Figure 2 is a vertical cross-sectional view of the blank shown in Figure 1 after the interior of the blank has been machined.

In Figure 2 the blank 10 is shown in a machined state wherein the bore 11 is machined to provide a blind end 12a of a flatter contour than that originally present at 12 in the pierced blank. The shallow concave contour 12a is substantially maintained during the entire process of fabricating the valve.

Figure 3:
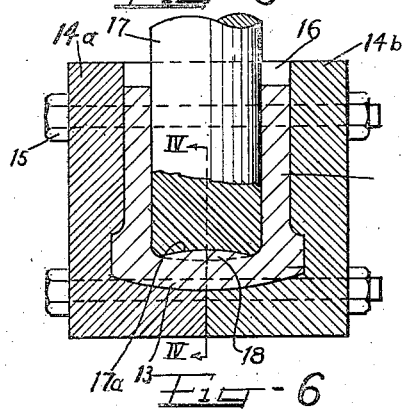
Figure 3 is a vertical cross-sectional view with parts in elevation illustrating one method of forming a rib on the dome of the blank shown in Figure 2.
Figure 4:
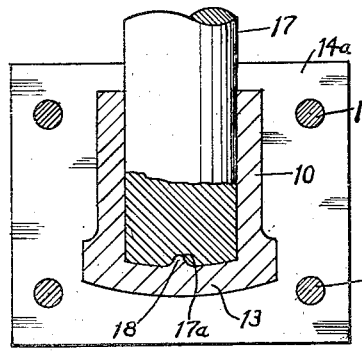
Figure 4 is a vertical cross-sectional view, with parts in elevation, taken along the line IV—IV of Figure 3.

In Figures 3 and 4 the machined blank 10 is illustrated as mounted in a die 14 formed in two half-sections 14a and 14b held together by means of bolts such as 15 and, when bolted together, defining a cavity 16 having the contour of the machined blank 10 and snugly receiving the blank therein as shown. A plunger 17 having a grooved end 17a is forced into the bore 11 of the blank 10 and pressed against the head 13 of the blank under great pressure to cause metal to flow from the head into the groove 17a of the plunger and thus produce a rib 18 across the inner face of the domed valve head. This rib 18 stiffens the dome and reinforces the same against collapsing by external pressures.

Figures 5, 6:
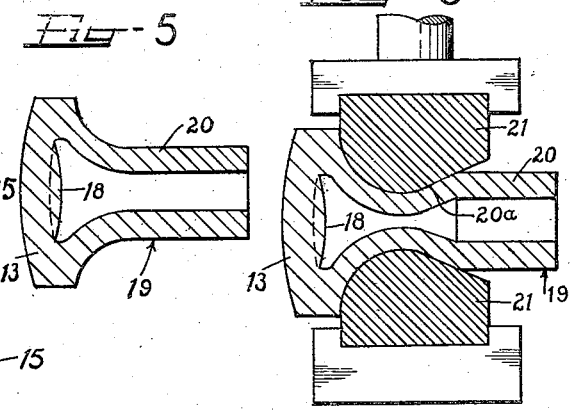
Figure 5 is an axial cross-sectional view of a partially formed valve body made from the blank shown in Figures 3 and 4.
Figure 6 is a vertical cross-sectional view, with parts in elevation, showing a swaging operation for necking down the valve body shown in Figure 5.
Figure 7:
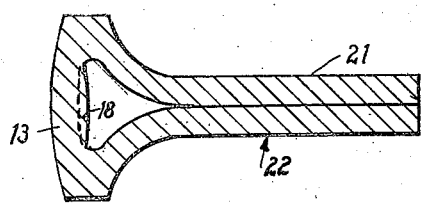
Figure 7 is a vertical cross-sectional view of a valve body formed from the body shown in Figure 6 and having a solid or collapsed stem portion.

The ribbed blank is then removed from the die 14 and subjected to alternate swaging and extrusion operations for forming a valve body 19 shown in Figure 5. The valve body 19 has a partially formed stem portion 20 of reduced diameter. The valve body 19 is next subjected to a necking down swaging operation as shown in Figure 6 wherein the stem portion adjacent the head 13 is necked down as at 20a by means of swaging dies 21. The necked down valve body 19 is next subject to extrusion operations which reduce and collapse the necked down stem portion 20 into a solid reduced stem 21 of reduced diameter as shown in Figure 7. The valve body 22 thus produced has a solid stem 21 and a hollow head 13. The end of the solid stem 21 is next upset as shown at 21a in Figure 8 to provide a thickened portion thereon.

Figure 8:
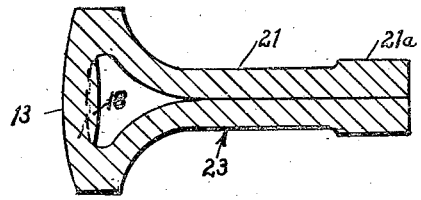
Figure 8 is a view similar to Figure 7 but illustrating an enlarged upset end portion on the stem.
Figure 9:
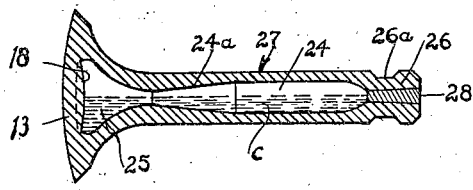
Figure 9 is a vertical cross-sectional view of a finished hollow valve made from the body illustrated in Figure 8.

The valve body 23 of Figure 8 is next machined and axially drilled to produce the finished valve 27 shown in Figure 9. The stem portion 21 of the body 23 is drilled to provide the bore 24 having a tapered end 24a communicating with the cavity 25 in the head 13 of the valve. The thickened portion 21a of the blank 23 is pressed in to close the open end of the bore 24 as at 26 and the closed portion is then bored to receive a sealing plug 28. Metallic sodium or other coolant C is placed in the cavity provided by the bores 24, 24a and the head cavity 25, and is sealed in these cavities by means of the plug 28. An annular groove 26a is provided around the end of the stem for receiving a valve spring retainer.

The finished valve 27 shown in Figure 9 thus has a hollow stem and head and the dome of the head has an internal rib 18 extending thereacross to resist collapsing forces applied externally on the dome.

The valve 27, as best shown in Figures 10 to 12, has a comparatively thin domed head 13 and this thin head is reinforced by the internal rib 18 which bridges a substantial portion of the dome between the side walls. This bridging rib so greatly stiffens the dome that very thin walls can be used in the dome.

The valve head is preferably grooved around the side periphery thereof to receive a bearing ring 29. This ring 29 serves as the seat for the valve and can be made of a wear-resisting alloy different from the metal making up the valve body. The ring 29 can be welded in the groove around the valve head or can be puddled from molten metal into this groove.

As shown in Figure 10, the rib 18 is longitudinally curved and merges at its ends 18a into the dome head 13 with a gently curved contour. The rib 18 does not extend to the sides of the valve head cavity 25. As shown in Figures 11 and 12, the rib 18 is also curved in transverse cross section to provide a somewhat rounded contour 18b. This transverse contour readily lends itself to die pressure formation and at the same time gives a very efficient stiffening effect to the rib.

In Figures 13 to 16, the reference numerals 13a, 13b, 13c and 13d represent the inner faces of valve heads or domes similar to the heads or domes 13 described in Figures 1 to 12. The dome 13a in Figure 13 has a single rib 30 integrally formed thereon and depending into the interior of the valve across the entire dome or head. In other words, the rib 30 differs from the rib 18 in that it bridges the entire span of the dome from side to side and through the center of the head. The rib 30 preferably has the general transverse contour 18b of the rib 18 and can, if desired, be longitudinally curved like the rib 18 to merge into the side walls of the valve along a gently sloping line.

In Figure 14 the valve head or dome 13b is provided with a rib 31 in the shape of a Greek cross. This rib 31 has four legs of equal length merging in the exact center of the dome and extending to the side walls of the valve. The rib 31 can be transversely shaped as at 31b (Fig. 19) like the rib 18 and the legs of the rib 31 can also be curved longitudinally as at 31a (Fig. 19) like the rib 18.

In Figure 15 the valve head or dome 13c is provided with a rib 32 of checkerboard design. In other words the rib 32 has parallel legs 33 and 34 intersecting with another pair of parallel ribs 35 and 36 at right angles to the first mentioned pair. The ribs 33, 34, 35 and 36 are equally spaced from the center of the dome 13c and a square such as 37 is thus provided in center of the valve dome bounded by square segments 38. The extremities of the ribs 34 to 36 merge into the side walls of the valve and each rib can have a transverse contour similar to the contour 18b of the rib 18.

In Figure 16 the valve head or dome has two parallel ribs 39 and 40 equally spaced from the center of the dome and bridging the entire span of the dome.

The forms of ribs shown in Figures 13 to 16 can be made in the same manner illustrated in Figures 3 and 4 merely providing the plunger 17 with a groove or grooves capable of producing the illustrated patterns in Figures 13 to 16.

In order to extend the ribs to the side walls of the valve head, the groove in the plunger 17 would be extended to the outer periphery of the plunger.

In Figures 17 and 18 there is illustrated another method of forming a rib on the head or dome of a valve body. In Figures 17 and 18 the reference numeral 41 designates generally a forged valve body having a domed head portion 42, a pierced cylindrical cavity 43, and an enlarged head cavity 44. The body 41 differs from the blank 10 shown in Figures 1 and 2 in that the head cavity 44 is already formed larger than the cavity or bore 43. The body 41 compares generally with the body 19 shown in Figure 5 prior to the last forging operation which further reduced the stem portion 20.

The body 41 is seated on a stationary punch 45 having a rib forming groove 45a in the upper end thereof. The end of the punch having the groove 45a therein receives the dome 42 of the body thereon.

A movable punch 46 having a tongue 46a projecting from the lower end thereof is forced down on top of the dome 42 with the tongue 46a in alignment with the groove 45a of the stationary punch. The tongue 46a then moves metal in the dome or head into the groove 45a of the stationary punch to form a rib 47 similar to the rib 18 described above in connection with Figures 3 to 12.

Since the valve head cavity 44 is larger than the cavity 43 the rib 47 formed by this movable and stationary punch method cannot extend to the side walls of the valve head inasmuch as the stationary die 45 must be small enough to fit through the smaller cavity 43.

The tongue 46a of the movable plunger 46 will leave a recess 48 in the outer wall of the valve head but this can be removed in subsequent manufacturing operations. For example, the head of the body 41 can be sufficiently thick at this stage of the valve forming operation so that metal can be removed to a depth greater than the depth of the recess 48 thus leaving a smooth unbroken surface on top of the body.

In the process illustrated in Figures 3 and 4, the rib portion of the valve head is actually thicker than the rest of the head wall since the enveloping die 14 for the valve blank permits gathering of the metal to form the rib, whereas in the method illustrated in Figures 17 and 18 the metal is only pushed into the groove of the stationary plunger to form the rib. However if the head metal is then removed down to the bottom of the recess 48, the rib portion of the resulting valve will be thicker than the rest of the head wall.

From the above descriptions it should be understood that this invention now provides for the stiffening and strengthening of the heads or domes in hollow poppet valves by adding a minimum of metal in the valve head. The ribbed hollow head valves of this invention can thus be made with the usual thin walls and at the same time the valves will resist greater external pressures than heretofore. The inwardly projecting ribs formed on the valve heads or domes according to this invention have a secondary function of providing an increased area on which the coolant in the valve can act so that heat transfer between the valve head and the coolant is enhanced.

It will, of course, be understood that various details of construction may be varied through a wide range without departing from the principles of this invention and it is, therefore, not the purpose to limit the patent granted hereon otherwise than necessitated by the scope of the appended claims.

We claim as our invention:

1. The method of stiffening the domes of hollow head poppet valves which comprises snugly confining the exterior of a hollow metal blank having a blind cavity therein bottomed by a solid wall, exerting pressure simultaneously on all of said solid wall with the exception of a localized central transversely extending portion of the inner face of the wall, and causing wall metal to flow to said portion in the blind cavity for forming a thickened solid rib on said wall in the cavity.

2. The method of stiffening the domes of hollow head poppet valves which comprises abutting the outer end face of a hollow metal valve blank with a member having continuous surface contact over the entire end face, abutting the inner end face of said blank with a rigid member having simultaneous contact with said inner face except at a localized rib-shaped recessed portion of the member, and squeezing said blank between said members under sufficiently high pressure to flow metal from the blank into said recess for forming an integral solid rib depending into the hollow interior of the blank and being thicker than the end wall of the blank.

3. In the method of making hollow head poppet valves including the formation of a cup-shaped metal blank, a swaging of the blank to neck down the side walls thereof adjacent the closed end thereof and the extrusion of the side wall from the necked-down portion thereof, the improvement of the steps of squeezing the end wall of the blank prior to the swaging operation between pressing surfaces including a surface having simultaneous contact with the inner face of the end wall except at a localized rib-shaped recessed portion converging away from the end wall to a maximum distance at the axial center of the end wall and continuing the squeezing operation until an integral solid stiffening rib is raised on the inner face of the end wall with its thickest portion at the center of the end wall.

THEODORE R. THOREN.
PAUL P. JOHNSON.